US 12,215,705 B2

(12) United States Patent
Tanaka et al.

(10) Patent No.: US 12,215,705 B2
(45) Date of Patent: Feb. 4, 2025

(54) TURBOCHARGER INCLUDING AN ANNULAR BEARING RETAINER PLATE

(71) Applicant: IHI Corporation, Tokyo (JP)

(72) Inventors: Takahiro Tanaka, Tokyo (JP); Akihiro Ueda, Tokyo (JP); Hideyuki Kojima, Tokyo (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 18/365,277

(22) Filed: Aug. 4, 2023

(65) Prior Publication Data

US 2023/0374998 A1    Nov. 23, 2023

Related U.S. Application Data

(63) Continuation of application No. PCT/JP2021/046603, filed on Dec. 16, 2021.

(30) Foreign Application Priority Data

Apr. 23, 2021 (JP) .................................. 2021-073665

(51) Int. Cl.
  *F04D 29/059*  (2006.01)
  *F02B 37/00*   (2006.01)
  (Continued)

(52) U.S. Cl.
  CPC ............ *F04D 29/059* (2013.01); *F02B 37/00* (2013.01); *F02B 39/14* (2013.01); *F04D 17/10* (2013.01);
  (Continued)

(58) Field of Classification Search
  CPC .. F04D 29/059; F04D 29/063; F04D 29/4206; F04D 29/049; F04D 17/10;
  (Continued)

(56) References Cited

U.S. PATENT DOCUMENTS 4,095,857 A * 6/1978 Palmer ................. F01D 25/186
                                                   277/423
4,171,137 A * 10/1979 Aizu ..................... F01D 11/003
                                                   415/111
(Continued)

FOREIGN PATENT DOCUMENTS

CN     103398095 A  * 11/2013
FR     2746849 A1   * 10/1997   ........... F01D 25/183
(Continued)

OTHER PUBLICATIONS

International Search Report issued Jan. 25, 2022 in PCT/JP2021/046603, filed on Dec. 16, 2021, 3 pages.

*Primary Examiner* — David E Sosnowski
*Assistant Examiner* — Wayne A Lambert
(74) *Attorney, Agent, or Firm* — Oblon, McClelland, Maier & Neustadt, L.L.P.

(57) ABSTRACT

A turbocharger includes: a shaft; a rolling bearing including an inner ring mounted on the shaft and an outer ring arranged around the inner ring; a housing including a bearing hole accommodating the rolling bearing; a compressor impeller provided on the shaft at an outside the bearing hole; and an annular bearing retainer plate arranged between the bearing hole and the compressor impeller in the central axis direction of the shaft and including an end face facing a side face of the outer ring, the end face including an annular circumferential oil groove continuously extending along the entire circumferential direction of the shaft and a protrusion located inside the circumferential oil groove in a radial direction of the shaft and protruding in a central axis direction of the shaft.

3 Claims, 7 Drawing Sheets

(51) Int. Cl.
*F02B 39/14* (2006.01)
*F04D 17/10* (2006.01)
*F04D 29/063* (2006.01)
*F04D 29/42* (2006.01)
*F16C 19/18* (2006.01)

(52) U.S. Cl.
CPC ....... *F04D 29/063* (2013.01); *F04D 29/4206* (2013.01); *F16C 19/184* (2013.01); *F16C 2360/24* (2013.01)

(58) Field of Classification Search
CPC .... F04D 29/051; F04D 25/024; F01D 25/183; F01D 25/16; F05D 2220/40; F05D 2260/79; F02B 37/00; F02B 39/14; F16C 19/184; F16C 19/547; F16C 2360/24; F16C 2260/79; F16C 33/6659
See application file for complete search history.

(56) References Cited

U.S. PATENT DOCUMENTS

| | | | | |
|---|---|---|---|---|
| 4,523,763 A * | 6/1985 | Asano | ................... | F01D 25/183 277/421 |
| 4,664,605 A * | 5/1987 | Asano | ................... | F04D 29/106 417/407 |
| 5,178,471 A * | 1/1993 | Roessler | ................. | F16C 33/14 384/369 |
| 8,794,905 B2 * | 8/2014 | Matsuyama | .......... | F01D 25/186 415/231 |
| 9,470,240 B2 * | 10/2016 | Uneura | ................. | F16C 17/047 |
| 9,581,043 B2 * | 2/2017 | Uneura | ............... | F16C 33/1075 |
| 9,771,946 B2 * | 9/2017 | Krejci | ................... | F01D 25/186 |
| 9,850,911 B2 * | 12/2017 | Dayalan | ................ | F04D 29/063 |
| 10,267,181 B2 * | 4/2019 | Archer | ................... | F01D 25/24 |
| 10,508,564 B2 * | 12/2019 | Haslinger | ............. | F01D 25/166 |
| 10,539,145 B2 * | 1/2020 | Ellwood | ................ | F01M 11/02 |
| 2007/0036477 A1 * | 2/2007 | McKeirnan | ........... | F16C 19/548 384/517 |
| 2011/0223010 A1 * | 9/2011 | Mundinger | ............. | F01D 25/16 277/412 |
| 2013/0183144 A1 * | 7/2013 | Schenkenberger | ..... | F01D 25/16 415/170.1 |
| 2017/0234213 A1 * | 8/2017 | Futae | .................. | F16C 33/1025 415/110 |
| 2017/0276233 A1 * | 9/2017 | Nishioka | ................. | F16C 17/04 |
| 2017/0298769 A1 | 10/2017 | Isogai | | |
| 2017/0328273 A1 | 11/2017 | Hettinger et al. | | |
| 2020/0011233 A1 * | 1/2020 | Oshita | ..................... | F04D 17/10 |
| 2021/0054879 A1 | 2/2021 | Uneura et al. | | |
| 2022/0034238 A1 * | 2/2022 | Maurer | ................... | F16C 35/02 |

FOREIGN PATENT DOCUMENTS

| | | | |
|---|---|---|---|
| JP | 58-108235 U | 7/1983 | |
| JP | 60-43137 U | 3/1985 | |
| JP | 1-127939 U | 8/1989 | |
| JP | H06317171 A * | 11/1994 | |
| JP | 3253000 B2 * | 2/2002 | .......... F16C 33/1045 |
| JP | 2002349551 A * | 12/2002 | ........... F16C 17/047 |
| JP | 2011-196248 A | 10/2011 | |
| JP | 2012-167606 A | 9/2012 | |
| JP | 2016-61381 A | 4/2016 | |
| KR | 100229345 B1 * | 11/1999 | |
| WO | WO 2020/021908 A1 | 1/2020 | |

* cited by examiner

TURBOCHARGER INCLUDING AN ANNULAR BEARING RETAINER PLATE

CROSS REFERENCE TO RELATED APPLICATIONS

This application is a continuation application of International Application No. PCT/JP2021/046603, filed on Dec. 16, 2021, which claims priority to Japanese Patent Application No. 2021-073665 filed on Apr. 23, 2021, the entire contents of which are incorporated herein by reference.

BACKGROUND ART

Technical Field

The present disclosure relates to a turbocharger.

A turbocharger may comprise a rolling bearing supporting a shaft. For example, a turbocharger of Patent Literature 1 comprises a pair of rolling bearings. A side surface of an outer ring of one of the rolling bearings faces a side wall of a housing. The side wall of the housing includes an oil supply groove. The oil supply groove extends along a radial direction of a shaft and is inclined with respect to a vertical axis extending upward from the shaft.

Furthermore, for example, a turbocharger of Patent Literature 2 comprises a pair of rolling bearings. A side surface of an outer ring of one of the rolling bearings faces a damper restrainer. The damper restrainer has a substantially circular shape. However, a lower portion of the damper restrainer includes a notch and is discontinuous in a circumferential direction. The damper restrainer includes an oil supply groove. The oil supply groove includes a substantially arcuate groove. The arcuate groove is spaced apart from an inner edge of the damper restrainer by a protrusion.

CITATION LIST

Patent Literature

Patent Literature 1: WO 2020/021908 A
Patent Literature 2: JP S60-43137 U

SUMMARY

Technical Problem

In a turbocharger, for example, a distance between a bearing hole and a compressor impeller may be shortened for downsizing. In this case, lubricant leakage from the bearing hole into an accommodation space of the compressor impeller may be a problem.

The purpose of the present disclosure is to provide a turbocharger that can reduce lubricant leakage in consideration of the above problem.

Solution to Problem

To solve the above problem, a turbocharger according to one aspect of the present disclosure includes: a shaft; a rolling bearing including an inner ring mounted on the shaft and an outer ring arranged around the inner ring; a housing including a bearing hole accommodating the rolling bearing; a compressor impeller provided on the shaft at an outside the bearing hole; and an annular bearing retainer plate arranged between the bearing hole and the compressor impeller in a central axis direction of the shaft and including an end face facing a side face of the outer ring, the end face including an annular circumferential oil groove continuously extending along the entire circumferential direction of the shaft and a protrusion located inside the circumferential oil groove in a radial direction of the shaft and protruding in the central axis direction of the shaft.

The protrusion may only be provided within a range of between −90 degrees and 90 degrees in a rotational direction of the shaft with respect to a vertical axis extending upward from a central axis of the shaft.

The end face of the bearing retainer plate may include a guide oil groove extending inward from an outside the side face of the outer ring when seen from the central axis direction of the shaft and connected to the circumferential oil groove, and the circumferential oil groove may be deeper than the guide oil groove.

The entirety of the guide oil groove may be located within a range of greater than 0 degrees and less than 90 degrees in the rotational direction of the shaft with respect to the vertical axis extending upward from the central axis of the shaft.

Effects of Disclosure

According to the present disclosure, lubricant leakage can be reduced.

DESCRIPTION OF EMBODIMENTS

Embodiments of the present disclosure will be described in detail below with reference to the accompanying drawings. Specific dimensions, materials, and numerical values described in the embodiments are merely examples for a better understanding, and do not limit the present disclosure unless otherwise specified. In this specification and the drawings, duplicate explanations are omitted for elements having substantially the same functions and configurations by assigning the same sign. Furthermore, elements not directly related to the present disclosure are omitted from the figures.

Figure 1:
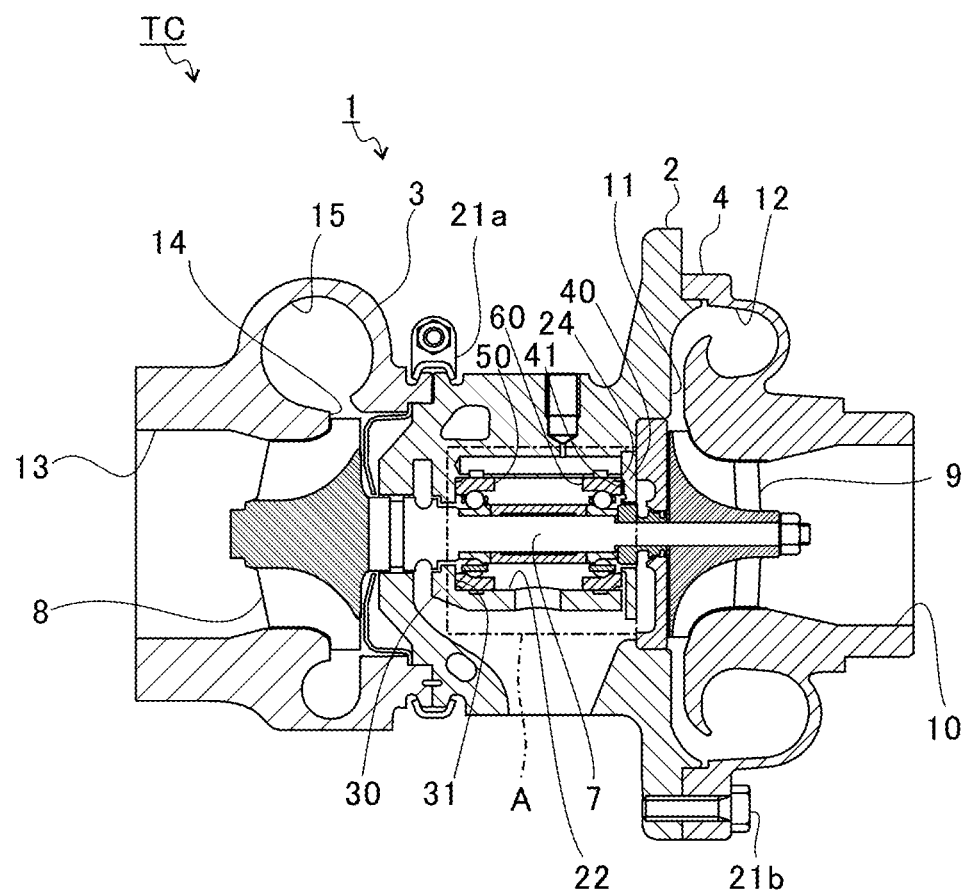
FIG. 1 is a schematic cross-sectional view of a turbocharger according to an embodiment.

FIG. 1 is a schematic cross-sectional view of a turbocharger TC according to an embodiment. For example, the turbocharger TC is applied to an engine. The turbocharger TC comprises a housing 1, a shaft 7, a turbine impeller 8, and a compressor impeller 9.

With regard to directions of the turbocharger TC in the present disclosure, a central axis direction, a radial direction, and a circumferential direction of the shaft 7 may simply be referred to as the "central axis direction," the "radial direction," and the "circumferential direction," respectively, unless otherwise indicated.

The housing 1 includes a bearing housing 2, a turbine housing 3, and a compressor housing 4. In the central axis direction, one end of the bearing housing 2 is connected to the turbine housing 3 by a fastening mechanism 21a such as a G-coupling. In the central axis direction, the other end of the bearing housing 2 is connected to the compressor housing 4 by a fastening mechanism 21b such as a fastening bolt.

The bearing housing 2 includes a bearing hole 22. The bearing hole 22 extends in the central axis direction in the bearing housing 2. In the central axis direction, one end of the bearing hole 22 is defined by a side wall 30 of the bearing housing 2. The side wall 30 is located between the turbine impeller 8 and the bearing hole 22 in the central axis direction. In the central axis direction, the other end of the bearing hole 22 is defined by a bearing retainer plate 40. The bearing retainer plate 40 is located between the compressor impeller 9 and the bearing hole 22 in the central axis direction.

The side wall 30 projects radially inward with respect to an inner surface of the bearing hole 22. The side wall 30 is integral with the bearing housing 2. However, in other embodiments, the sidewall 30 may be separate from the bearing housing 2 and may be attached to the bearing housing 2. The sidewall 30 includes an end face 31. The end face 31 defines one end of the bearing hole 22 in the central axis direction.

The bearing retainer plate 40 is separate from the bearing housing 2 and is attached to a surface 24 of the bearing housing 2. The surface 24 extends perpendicular to the inner surface of the bearing hole 22. For example, the bearing retainer plate 40 is fitted into the bearing housing 2. The bearing retainer plate 40 includes a first end face 41. The first end face 41 defines the other end of the bearing hole 22 in the central axis direction. The bearing retainer plate 40 will be described in detail later.

The bearing hole 22 accommodates a pair of rolling bearings 50 and 60. The rolling bearings 50 and 60 rotatably support the shaft 7. The pair of rolling bearings 50 and 60 are spaced apart from each other in the central axis direction. In the present disclosure, the rolling bearing adjacent to the side wall 30 may be referred to as the first bearing 50. In the present disclosure, the rolling bearing adjacent to the bearing retainer plate 40 may be referred to as the second bearing 60.

In the central axis direction, a turbine impeller 8 is provided at a first end of the shaft 7. The turbine impeller 8 is located outside the bearing hole 22 in the central axis direction. The turbine impeller 8 is rotatably housed in the turbine housing 3. In the central axis direction, a compressor impeller 9 is provided at a second end of the shaft 7 opposite to the first end. The compressor impeller 9 is located outside the bearing hole 22 in the central axis direction. The compressor impeller 9 is rotatably housed in the compressor housing 4.

The compressor housing 4 includes an inlet 10 at an end opposite to the bearing housing 2 in the central axis direction. The inlet 10 is connected to an air cleaner (not shown). The bearing housing 2 and the compressor housing 4 define a diffuser flow path 11 therebetween. The diffuser flow path 11 radially extends from an inner side to an outer side. The diffuser flow path 11 has an annular shape. The diffuser flow path 11 is connected to the inlet 10 via the compressor impeller 9.

The compressor housing 4 includes a compressor scroll flow path 12. The compressor scroll flow path 12 is located radially outside the compressor impeller 9. The compressor scroll flow path 12 is connected to the diffuser flow path 11. Furthermore, the compressor scroll flow path 12 is connected to an intake port of an engine (not shown). When the compressor impeller 9 rotates, air is sucked into the compressor housing 4 from the inlet 10. The sucked air is accelerated by centrifugal force while passing through spaces between blades of the compressor impeller 9. The accelerated air is pressurized in the diffuser flow path 11 and the compressor scroll flow path 12. The pressurized air flows out of an outlet (not shown) and is directed to the intake port of the engine.

The turbine housing 3 includes an outlet 13 at an end opposite to the bearing housing 2 in the central axis direction. The outlet 13 is connected to an exhaust gas purifier (not shown). The turbine housing 3 includes a flow path 14 and a turbine scroll flow path 15. The turbine scroll flow path 15 is located radially outside the turbine impeller 8. The flow path 14 is located between the turbine impeller 8 and the turbine scroll flow path 15.

The turbine scroll flow path 15 is connected to a gas inlet (not shown). The gas inlet receives exhaust gas discharged from an exhaust manifold of the engine (not shown). The turbine scroll flow path 15 is connected to the flow path 14. The flow path 14 is connected to the outlet 13 via the turbine impeller 8. The exhaust gas is directed from the gas inlet to the turbine scroll flow path 15 and then to the outlet 13 via the flow path 14 and the turbine impeller 8. The exhaust gas rotates the turbine impeller 8 while passing through spaces between blades of the turbine impeller 8.

The rotational force of the turbine impeller 8 is transmitted to the compressor impeller 9 via the shaft 7. As the compressor impeller 9 rotates, air is pressurized as described above. As such, the pressurized air is directed to the intake port of the engine.

Figure 2:
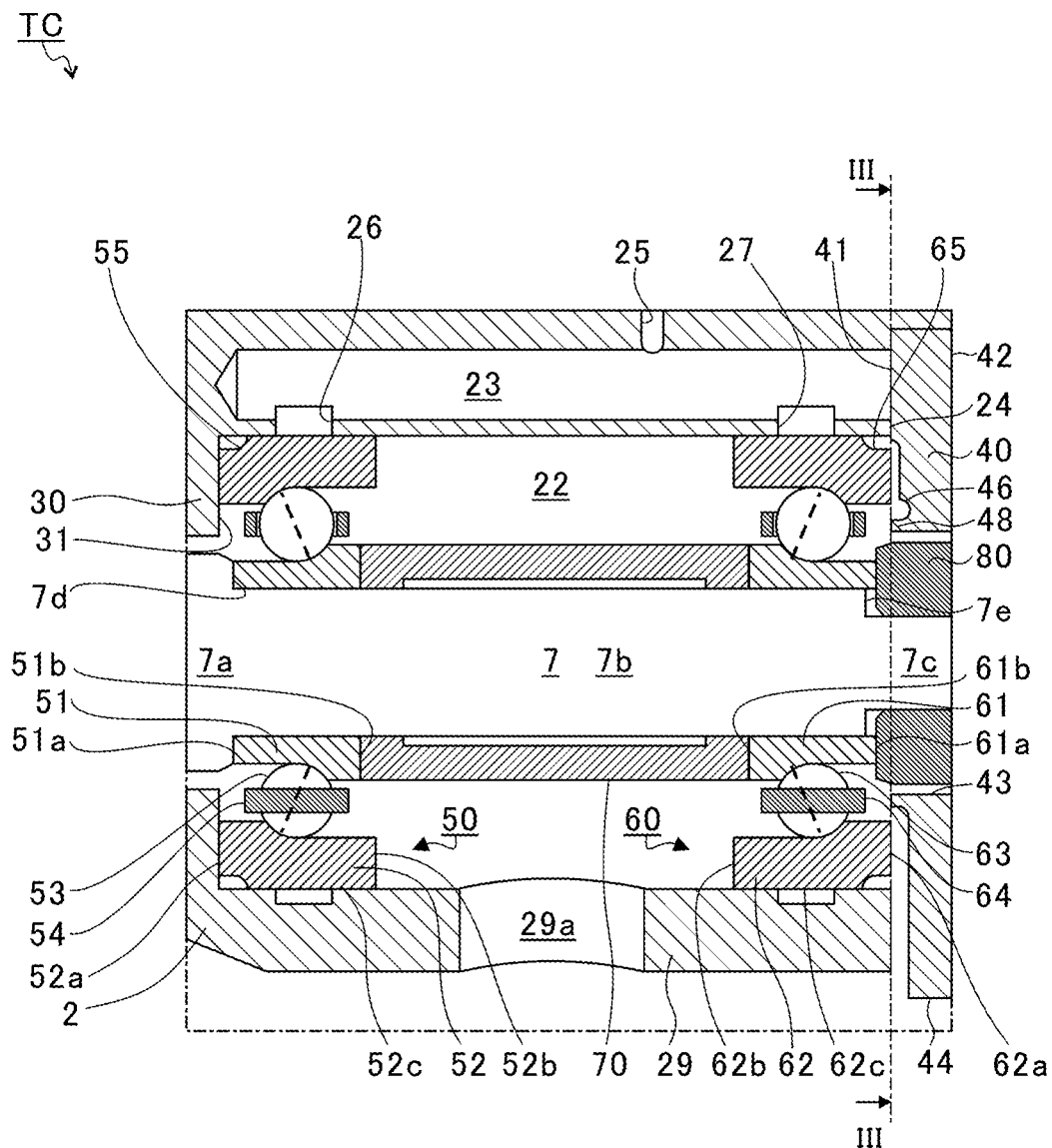
FIG. 2 is a schematic enlarged cross-sectional view of section A in FIG. 1.

FIG. 2 is a schematic enlarged cross-sectional view of section A in FIG. 1. The bearing housing 2 includes a main oil path 23. The main oil path 23 extends in the central axis direction. The main oil path 23 extends parallel to the bearing hole 22. The main oil path 23 is located above the bearing hole 22.

The bearing hole 22 and the main oil path 23 open on the surface 24 of the bearing housing 2. As described above, the bearing retainer plate 40 is attached to the surface 24. The bearing retainer plate 40 closes an opening of the main oil path 23.

The main oil path 23 is connected to a through hole 25. The through hole 25 is formed in the bearing housing 2. The through hole 25 extends from an outer wall of the bearing housing 2 to the main oil path 23. Lubricant is supplied from an oil pump (not shown) to the main oil path 23 via the through hole 25.

The bearing housing 2 includes a first oil path 26 and a second oil path 27. Each of the first oil path 26 and the second oil path 27 opens to the main oil path 23. Furthermore, each of the first oil path 26 and the second oil path 27 opens to the bearing hole 22. Each of the first oil path 26 and the second oil path 27 connects the main oil path 23 to the bearing hole 22. The first oil path 26 is provided at a position corresponding to the first bearing 50 in the central axis direction and opens toward the first bearing 50. The second oil path 27 is provided at a position corresponding to the second bearing 60 in the central axis direction and opens toward the second bearing 60.

The bearing housing 2 includes a lower wall 29. The lower wall 29 defines the lower portion of the bearing hole 22 in the radial direction. The lower wall 29 includes an oil drain hole 29a. The oil drain hole 29a passes through the lower wall 29 in the vertical direction. For example, in the central axis direction, the oil drain hole 29a is located between the first oil path 26 and the second oil path 27. In other words, the oil drain hole 29a is located between the first bearing 50 and the second bearing 60 in the central axis direction.

The bearing hole 22 accommodates a part of the shaft 7. The shaft 7 includes a large diameter portion 7a, a medium diameter portion 7b, and a small diameter portion 7c. In the central axis direction, the medium diameter portion 7b is located between the side wall 30 and the bearing retainer plate 40. In the central axis direction, the large diameter portion 7a is located between the first end of the shaft 7 and the medium diameter portion 7b. In the central axis direction, the small diameter portion 7c is located between the second end of the shaft 7 and the medium diameter portion 7b. An outer diameter of the medium diameter portion 7b is smaller than an outer diameter of the large diameter portion 7a. An outer diameter of the small diameter portion 7c is smaller than the outer diameter of the medium diameter portion 7b.

The shaft 7 includes a first step surface 7d and a second step surface 7e. In the central axis direction, the first step surface 7d is located between the large diameter portion 7a and the medium diameter portion 7b. The first step surface 7d radially extends from an outer circumferential surface of the large diameter portion 7a to an outer circumferential surface of the medium diameter portion 7b. In the central axis direction, the second step surface 7e is located between the medium diameter portion 7b and the small diameter portion 7c. The second step surface 7e radially extends from the outer circumferential surface of the medium diameter portion 7b to an outer circumferential surface of the small diameter portion 7c.

The first bearing 50 includes an inner ring 51, an outer ring 52, a plurality of rolling elements 53, and a cage 54. The inner ring 51 is mounted on the outer circumferential surface of the medium diameter portion 7b of the shaft 7. The inner ring 51 integrally rotates with the shaft 7. The outer ring 52 is provided radially outside the inner ring 51. The outer ring 52 faces the inner surface of the bearing hole 22. The plurality of rolling elements 53 are arranged between the inner ring 51 and the outer ring 52. The cage 54 holds the plurality of rolling elements 53.

The second bearing 60 includes an inner ring 61, an outer ring 62, a plurality of rolling elements 63, and a cage 64. The inner ring 61 is mounted on the outer circumferential surface of the medium diameter portion 7b of the shaft 7. The inner ring 61 integrally rotates with the shaft 7. The outer ring 62 is provided radially outside the inner ring 61. The outer ring 62 faces the inner surface of the bearing hole 22. The plurality of rolling elements 63 are arranged between the inner ring 61 and the outer ring 62. The cage 64 holds the plurality of rolling elements 63.

In the present disclosure, among side faces 51a, 51b, 61a and 61b of the inner ring 51 of the first bearing 50 and the inner ring 61 of the second bearing 60, the side faces that face each other in the central axis direction may be referred to as "inner side faces" 51b and 61b, and the side faces that are opposite to the inner side faces 51b and 61b may be referred to as "outer side faces" 51a and 61a.

Similarly, in the present disclosure, among side faces 52a, 52b, 62a and 62b of the outer ring 52 of the first bearing 50 and the outer ring 62 of the second bearing 60, the side faces that face each other in the central axis direction may be referred to as "inner side faces" 52b and 62b, and the side faces that are opposite to the inner side faces 52b and 62b may be referred to as "outer side faces" 52a and 62a.

The outer side face 51a of the inner ring 51 of the first bearing 50 contacts the first step surface 7d of the shaft 7 in the central axis direction. Furthermore, the outer side face 52a of the outer ring 52 of the first bearing 50 faces the end face 31 of the side wall 30 in the central axis direction.

A spacer 70 is provided on the medium diameter portion 7b of the shaft 7 between the inner ring 51 and the inner ring 61. The spacer 70 has a substantially cylindrical shape. The shaft 7 is inserted into the spacer 70. In other embodiments, a spring and a spring receiver may be provided instead of the spacer 70.

The inner side face 51b of the inner ring 51 of the first bearing 50 contacts one end of the spacer 70 in the central axis direction. The inner side face 61b of the inner ring 61 of the second bearing 60 contacts the other end of the spacer 70 in the central axis direction.

An oil thrower 80 is mounted on the small diameter portion 7c of the shaft 7. The oil thrower 80 scatters lubricant radially outward. The oil thrower 80 is provided radially inside the bearing retainer plate 40. The oil thrower 80 is radially spaced apart from the bearing retainer plate 40.

The outer side face 61a of the inner ring 61 of the second bearing 60 contacts the oil thrower 80 in the central axis direction. Furthermore, the outer side face 62a of the outer ring 62 of the second bearing 60 faces the bearing retainer plate 40 in the central axis direction.

The first bearing 50, the spacer 70, the second bearing 60, the oil thrower 80 and the compressor impeller 9 are mounted on the shaft 7 in this order through the end of the shaft 7 on a side of the compressor impeller 9. A fastening bolt provided on the second end of the shaft 7 applies a compressive stress on these members in the central axis direction, thereby applying an axial force to the shaft 7. The inner ring 51 of the first bearing 50, the spacer 70, the inner ring 61 of the second bearing 60, the oil thrower 80 and the compressor impeller 9 integrally rotate with the shaft 7.

An outer circumferential surface 52c of the outer ring 52 of the first bearing 50 includes a notch 55. The notch 55 has an annular shape. The notch 55 is adjacent to the outer side face 52a. An outer diameter of the outer side face 52a is smaller than a diameter of the outer circumferential surface 52c by a radial length of the notch 55.

An outer circumferential surface 62c of the outer ring 62 of the second bearing 60 includes a notch 65. The notch 65 has an annular shape. The notch 65 is adjacent to the outer side face 62a. An outer diameter of outer side face 62a is smaller than a diameter of the outer circumferential surface 62c by a radial length of the notch 65.

When a thrust load acts on the shaft 7 toward the turbine impeller 8, the outer ring 52 of the first bearing 50 presses the sidewall 30. As such, the side wall 30 functions as a restrainer that restricts an axial movement of the outer ring 52. Furthermore, when a thrust load acts on the shaft 7 toward the compressor impeller 9, the outer ring 62 of the second bearing 60 presses the bearing retainer plate 40. As such, the bearing retainer plate 40 functions as a restrainer that restricts an axial movement of the outer ring 62. According to the above configuration, a movement of the shaft 7 due to the thrust loads is stopped by the side wall 30 and the bearing retainer plate 40.

In the present embodiment, the turbocharger TC does not have a rotation stopper for the outer rings 52 and 62. The outer ring 52 is circumferentially rotatable with respect to the bearing housing 2 when not pressing the side wall 30. Similarly, the outer ring 62 is circumferentially rotatable with respect to the bearing housing 2 when not pressing the bearing retainer plate 40. When the shaft 7 rotates, the inner rings 51 and 61 rotate with the shaft 7. The rolling elements 53 and 63 rotate as the inner rings 51 and 61 rotate. The rolling elements 53 and 63 move in the circumferential direction. The outer rings 52 and 62 rotate in the circumferential direction as the rolling elements 53 and 63 rotate and move, or as the lubricant flows. The rotational speed of the outer ring 52 is slower than that of the inner ring 51. Furthermore, in the present embodiment, the pair of rolling bearings 50 and 60 are configured as a face-to-face duplex bearing. As such, no spacer is needed between the outer rings 52 and 62. Therefore, no preload is applied to the outer rings 52 and 62. As a result, the outer rings 52 and 62 can easily rotate with respect to the bearing housing 2.

Next, the bearing retainer plate 40 is described in detail.

Figure 3:
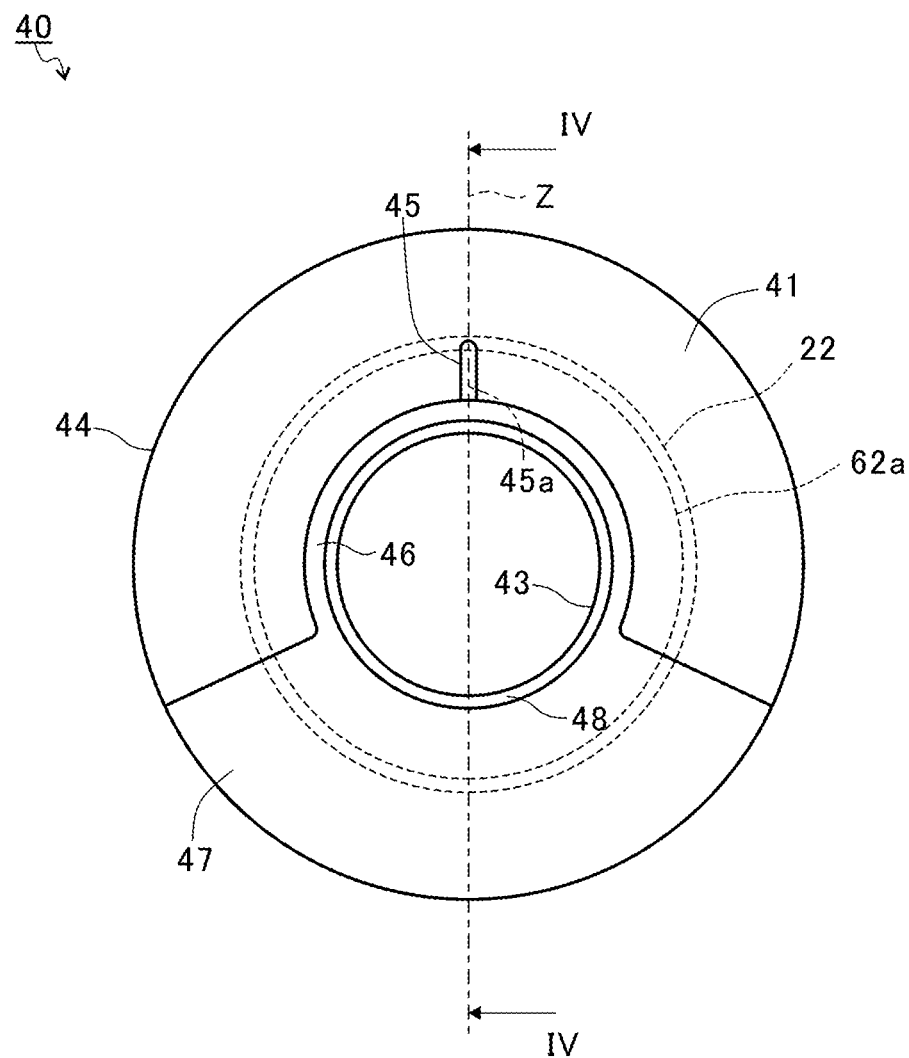
FIG. 3 is a schematic plan view of a bearing retainer plate.

FIG. 3 is a schematic plan view of the bearing retainer plate 40, wherein the bearing retainer plate 40 is viewed from the bearing hole 22 in the central axis direction. In other words, FIG. 3 is taken along line III-III in FIG. 2. In FIG. 3, an inner diameter of the bearing hole 22 is indicated by a dashed line. Furthermore, the outer diameter of the outer side face 62a of the second bearing 60 is indicated by a dashed line. Reference sign Z indicates a vertical axis extending upward from the central axis of the shaft 7.

The bearing retainer plate 40 has a substantially annular shape or disk shape. The bearing retainer plate 40 includes an inner edge 43 and an outer edge 44.

Referring to FIG. 2, for example, a diameter of the inner edge 43 is smaller than the innermost diameter of the outer ring 62 of the second bearing 60 and larger than an outer diameter of the oil thrower 80. Furthermore, for example, a diameter of the outer edge 44 is larger than the inner diameter of the bearing hole 22. The bearing retainer plate 40 includes a first end face 41 and a second end face 42 in the central axis direction. As described above, the first end face 41 defines the end of the bearing hole 22 in the central axis direction. The first end face 41 faces the outer side face 62a of the outer ring 62 in the central axis direction. The second end face 42 is located opposite to the first end face 41.

Referring to FIG. 3, the first end face 41 includes a guide oil groove 45, a circumferential oil groove 46, an oil drain surface 47, and a protrusion 48.

The guide oil groove 45 connects a gap between the outer ring 62 and the bearing hole 22 to the circumferential oil groove 46, and directs lubricant in this gap to the circumferential oil groove 46. The guide oil groove 45 extends radially inward from an outer side of the outer side face 62a of the outer ring 62, when seen from the center axis direction. In the present embodiment, the guide oil groove 45 has a substantially straight shape along the radial direction. In the present embodiment, the guide oil groove 45 has a central axis 45a extending along the radial direction. In the present embodiment, the central axis 45a is located on the vertical axis Z. In other embodiments, the guide oil groove 45 does not have to extend along the radial direction, as long as it extends inward from the outer side of the side face 62a. In other words, in other embodiments, the central axis 45a may not extend toward the central axis of the shaft 7. The guide oil groove 45 extends to and is connected to the circumferential oil groove 46.

In a cross section perpendicular to the radial direction, the guide oil groove 45 may have various cross-sectional shapes, such as a semi-circular shape, a triangular shape, or a square shape. Dimensions of the guide oil groove 45, such as width and depth, are determined according to factors such as, for example, a flow rate of lubricant supplied to the second bearing 60.

The circumferential oil groove 46 receives lubricant from the guide oil groove 45, and directs the received lubricant toward a circumferential direction. The circumferential oil groove 46 is located radially inside the guide oil groove 45. The circumferential oil groove 46 is connected to the guide oil groove 45. The circumferential oil groove 46 extends along the circumferential direction. The circumferential oil groove 46 is continuous throughout the circumferential direction and has an annular shape. The circumferential oil groove 46 is spaced apart from the inner edge 43 by the protrusion 48. The circumferential oil groove 46 is integrally formed with the oil drain surface 47 at a lower section.

Referring to FIG. 2, in the present embodiment, an outer diameter of the circumferential oil groove 46 is the same or approximately the same as an inner diameter of the outer side face 62a of the outer ring 62. In other embodiments, the outer diameter of the circumferential oil groove 46 may be smaller or larger than the inner diameter of the outer side face 62a.

Figure 4:
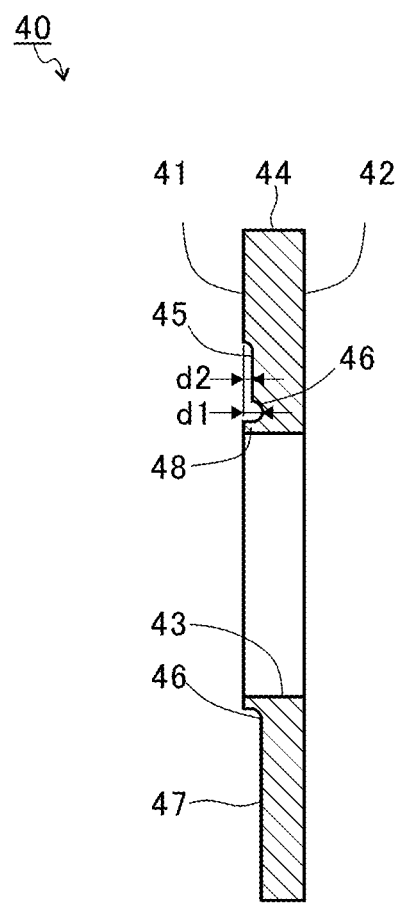
FIG. 4 is a schematic cross-sectional view taken along line IV-IV in FIG. 3.

FIG. 4 is a schematic cross-sectional view taken along line IV-IV in FIG. 3. In the present embodiment, a depth d1 of the circumferential oil groove 46 is deeper than a depth d2 of the guide oil groove 45. In other embodiments, the depth d1 of the circumferential oil groove 46 may be the same as the depth d2 of the guide oil groove 45.

In a cross-section perpendicular to the circumferential direction, the circumferential oil groove 46 may have various cross-sectional shapes, such as a semi-circular shape, a triangular shape, or a square shape. Dimensions of the circumferential oil groove 46, such as width and depth, are determined by factors such as, for example, the flow rate of lubricant supplied to the second bearing 60.

The oil drain surface 47 is provided in a lower area of the first end face 41. The oil drain surface 47 directs lubricant below the shaft 7 toward the lower wall 29. The oil drain surface 47 is formed continuous with the circumferential oil groove 46. Accordingly, a depth of the oil drain surface 47 is the same as the depth d2 of the circumferential oil groove 46.

Referring to FIG. 3, the oil drain surface 47 has a sector shape coaxial to the shaft 7, when seen from the central axis direction. For example, the oil drain surface 47 may only be provided within a range of between 90 degrees and 270 degrees in the rotational direction with respect to the vertical axis Z. In other words, the oil drain surface 47 may only be provided on the lower half of the bearing retainer plate 40.

The protrusion 48 is located radially inside the circumferential oil groove 46. In the present embodiment, the protrusion 48 continuously extends along the entire circumferential direction. In other words, in the present embodiment, the protrusion 48 has an annular shape.

Referring to FIG. 4, the protrusion 48 protrudes from the circumferential oil groove 46 toward the second bearing 60 in the central axis direction. With regard to a height of the protrusion 48, the protrusion 48 may be flush with the first end face 41, for example.

Referring to FIG. 2, in the turbocharger TC as described above, when lubricant is supplied to the main oil path 23 from the through hole 25, the lubricant flows from the second oil path 27 into a gap between the outer circumferential surface 62c of the outer ring 62 of the second bearing 60 and the bearing hole 22. The lubricant is supplied from this gap to a space around the shaft 7 via the outer side face 62a and the inner side face 62b. By this configuration, the lubricant is supplied to a space between the inner ring 61 and the outer ring 62.

Referring to FIG. 3, especially when the outer side face 62a of the outer ring 62 contacts the first end face 41 of the bearing retainer plate 40, the lubricant is supplied through the guide oil groove 45 to the circumferential oil groove 46 of the bearing retainer plate 40. The lubricant in the circumferential oil groove 46 is directed in the circumferential direction along the protrusions 48. According to such a configuration, a length in the central axis direction of a gap between the bearing retainer plate 40 and the oil thrower 80 is increased by the height of the protrusion 48, and thereby lubricant leakage to the second section 42 of the bearing retainer plate 40 can be reduced. For example, if a distance between the bearing hole 22 and the compressor impeller 9 is shortened for downsizing, lubricant leakage from the bearing hole 22 to the accommodation space of the compressor impeller 9 may be a problem. According to the above configuration, such lubricant leakage can be reduced. Furthermore, the lubricant is directed to the space between the inner ring 61 and outer ring 62 along the protrusion 48 in the central axis direction. Accordingly, the lubricant can be efficiently directed to the space between the inner ring 61 and outer ring 62. As such, the lubrication of the second bearing 60 can be improved.

Referring to FIG. 2, when the lubricant is supplied into the main oil path 23 from the through hole 25, the lubricant flows from the first oil path 26 into a gap between the outer circumferential surface 52c of the outer ring 52 of the first bearing 50 and the bearing hole 22. The lubricant flows from this gap into a space around the shaft 7 via the outer side face 52a and the inner side face 52b. By this configuration, the lubricant is supplied to a space between the inner ring 51 and outer ring 52 and a space between the sidewall 30 and the large diameter portion 7a of the shaft 7.

The turbocharger TC as described above comprises the shaft 7, the second bearing 60 including the inner ring 61 mounted on the shaft 7 and the outer ring 62 arranged around the inner ring 61, the bearing housing 2 including the bearing hole 22 accommodating the second bearing 60, the compressor impeller 9 provided on the shaft 7 at an outside the bearing hole 22, the annular bearing retainer plate 40 arranged between the bearing hole 22 and the compressor impeller 9 in the central axis direction and including the first end face 41 facing the outer side face 62a of the outer ring 62, the first end face 41 including the annular circumferential oil groove 46 continuously extending along the entire circumferential direction and the protrusion 48 located radially inside the circumferential oil groove 46 and protruding in the central axis direction. According to such a configuration, the length in the central axis direction of the gap between the bearing retainer plate 40 and the oil thrower 80 is increased by the height of the protrusion 48, and thereby lubricant leakage to the second end face 42 of the bearing retainer plate 40 can be reduced, as described above. As such, lubricant leakage can be reduced. Furthermore, according to the above configuration, the lubricant is directed to the space between the inner ring 61 and outer ring 62 along the protrusion 48 in the central axis direction. Accordingly, the lubricant can be efficiently directed to the space between the inner ring 61 and outer ring 62. As a result, the lubrication of the second bearing 60 can be improved.

Furthermore, in the turbocharger TC, the first end face 41 of the bearing retainer plate 40 includes the guide oil groove 45 extending radially inward from the outer side of the outer side face 62a of the outer ring 62 and connected to the circumferential oil groove 46 when seen from the central axis direction, and the circumferential oil groove 46 is deeper than the guide oil groove 45. In this case, more lubricant is directed downward along the circumferential direction, and thereby efficiently directing the lubricant in the discharge direction.

Next, a bearing retainer plate according to another embodiment is described.

Figure 5:
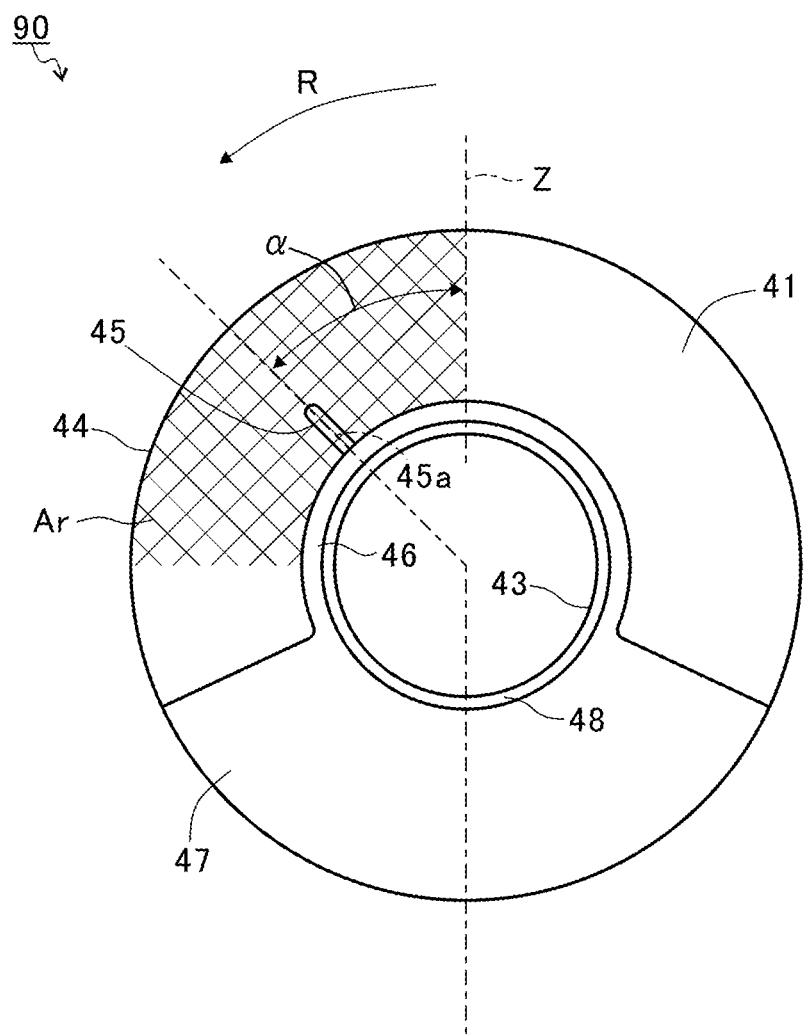
FIG. 5 is a schematic plan view of a bearing retainer plate according to another embodiment.

FIG. 5 is a schematic plan view of a bearing retainer plate 90 according to another embodiment. In FIG. 5, arrow R indicates a rotational direction of the shaft 7. The reference sign Z indicates the vertical axis extending upward from the central axis of the shaft 7. The bearing retainer plate 90 differs from the bearing retainer plate 40 described above in that the guide oil groove 45 is inclined in the rotational direction R of the shaft 7. In other respects, the bearing retainer plate 90 may be the same as the bearing retainer plate 40.

In the present embodiment, the entirety of the guide oil groove 45 including the outermost portion and the innermost portion in the radial direction is located in a range Ar of greater than 0 degrees and less than 90 degrees in the rotational direction R with respect to the vertical axis Z. In FIG. 5, the cross-hatched area indicates the range Ar. In the present embodiment, the central axis 45a is located at 45 degrees in the rotational direction R with respect to the vertical axis Z. In other words, an angle α between the central axis 45a and the vertical axis Z is 45 degrees. In other embodiments, the angle α may be greater than 0 degrees and less than 90 degrees, as long as the entirety of the guide oil groove 45 is located in the range Ar1.

The turbocharger TC with the bearing retainer plate 90 as described above can have substantially the same effects as those of the turbocharger TC with the bearing retainer plate 40.

In particular, in the bearing retainer plate 90, the entirety of the guide oil groove 45 is located in the range of greater than 0 degrees and less than 90 degrees in the rotational direction R with respect to the vertical axis Z. According to this configuration, the lubricant passing through the guide oil groove 45 is supplied to the space around the shaft 7 in the range Ar of greater than 0 degrees and less than 90 degrees in the rotational direction R with respect to the vertical axis Z. In this case, both gravity and the rotational force from the shaft 7 act downward on the lubricant. Accordingly, the lubricant quickly flows downward toward the lower wall 29 including the oil drain hole 29a. As such, the lubricant can be efficiently directed in the discharge direction. Furthermore, since the lubricant is efficiently directed in the discharge direction around the gap between the bearing retainer plate 90 and the oil thrower 80, lubricant leakage from the bearing hole 22 into the gap is reduced.

Next, an evaluation of lubricant leakage is described.

Figure 6:
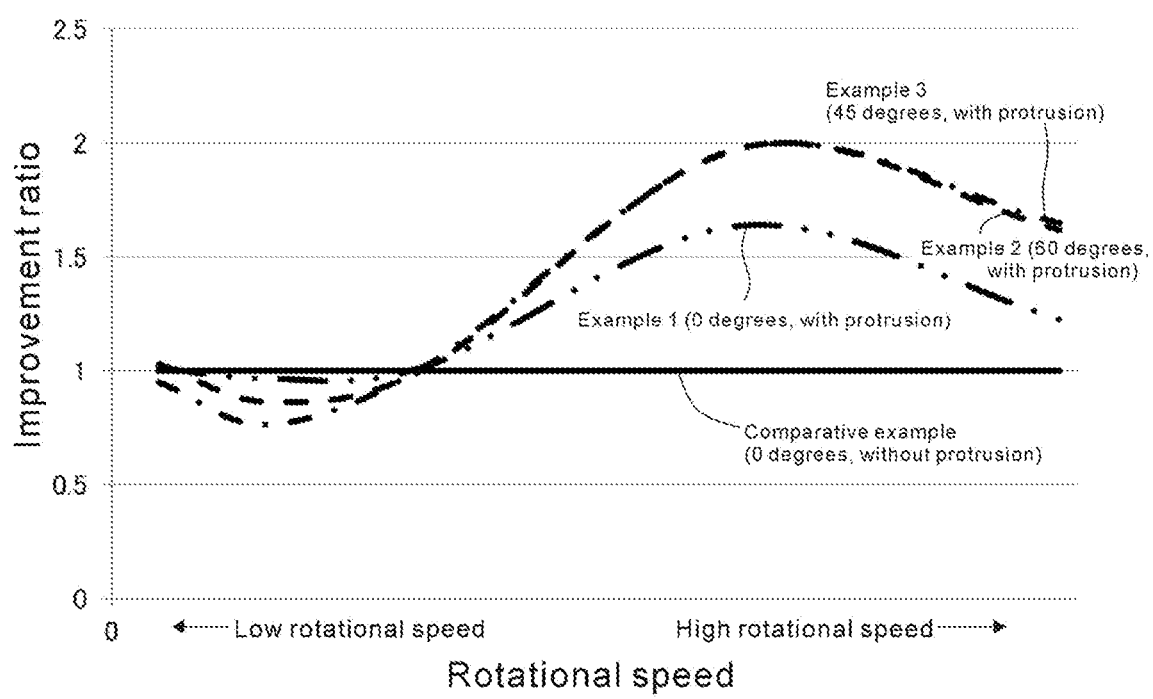
FIG. 6 is a graph indicating evaluation results of lubricant leakage.

FIG. 6 is a graph indicating evaluation results of lubricant leakage. In the evaluation shown in FIG. 6, the following four types of bearing retainer plates were used in the turbocharger TC.

Comparative example: The guide oil groove 45 is located at 0 degrees in the rotational direction R with respect to the vertical axis Z.

In other words, the guide oil groove 45 is located on the vertical axis Z.

No protrusion is provided.

In other respects, it is the same as the bearing retainer plate 40.

Example 1

The guide oil groove 45 is located at 0 degrees in the rotational direction R with respect to the vertical axis Z.
In other words, the guide oil groove 45 is located on the vertical axis Z.
The protrusion is provided.

Example 2

The guide oil groove 45 is located at 60 degrees in the rotational direction R with respect to the vertical axis Z.
The protrusion is provided.

Example 3

The guide oil groove 45 is located at degrees in the rotational direction R with respect to the vertical axis Z.
The protrusion is provided.
Each of the four types of bearing retainer plates was used to evaluate the followings.
The shaft 7 was rotated at a plurality of rotational speeds. At each of the plurality of rotational speeds, lubricant was supplied from the oil pump to the turbocharger TC at a plurality of flow rates. The flow rate was measured when lubricant leakage was observed from the gap between the bearing retainer plate and the oil thrower. A ratio of the flow rate of each of the four types of bearing retainer plates to the flow rate of the comparative example was calculated for the flow rate at which lubricant leakage was confirmed at each rotational speed. The calculated values are shown as an "improvement ratio" on the vertical axis in FIG. 6. When the improvement ratio is greater than 1, lubricant leakage is reduced relative to the comparative example. In contrast, when the improvement ratio is less than 1, lubricant leakage is increased relative to the comparative example. The solid line shows the improvement ratio of the comparative example relative to the comparative example, and therefore always indicates 1. The dashed-two dotted line shows the improvement ratio of Example 1 relative to the comparative example. The dashed line shows the improvement ratio of Example 2 relative to the comparative example. The dashed-dotted line shows the improvement ratio of Example 3 relative to the comparative example.

Since lubrication may be a problem in a high rotational speed area, lubricant leakage may also be a problem in the high rotational speed area. Therefore, we focus on the improvement ratio in the high rotational speed area.

By comparing the comparative example and Example 1, it can be seen whether the protrusion contributes to the reduction of lubricant leakage. As clearly seen in FIG. 6, the improvement ratio of Example 1 is greater than 1. Therefore, it can be seen that the protrusion contributes to the reduction of lubricant leakage.

By comparing Examples 1, 2 and 3, it can be seen whether inclining the guide oil groove 45 in the rotational direction contributes to the reduction of lubricant leakage. As clearly seen in FIG. 6, the improvement ratio of Example 2 is higher than that of Example 1. Furthermore, the improvement ratio of Example 3 is also higher than that of Example 1. Therefore, it can be seen that inclining the guide oil groove 45 in the rotational direction contributes to the reduction of lubricant leakage. The improvement ratio of Example 3 is approximately the same as that of Example 2. Accordingly, it can be seen that even if the guide oil groove 45 is inclined more than 45 degrees, the improvement ratio is the same as that of the case where the oil groove 45 is inclined 45 degrees. Therefore, it can be seen that lubricant leakage can be sufficiently reduced by inclining the guide oil groove 45 degrees.

Although the embodiments of the present disclosure have been described above with reference to the accompanying drawings, the present disclosure is not limited thereto. It is obvious that a person skilled in the art can conceive of various examples of variations or modifications within the scope of the claims, which are also understood to belong to the technical scope of the present disclosure.

Figure 7:
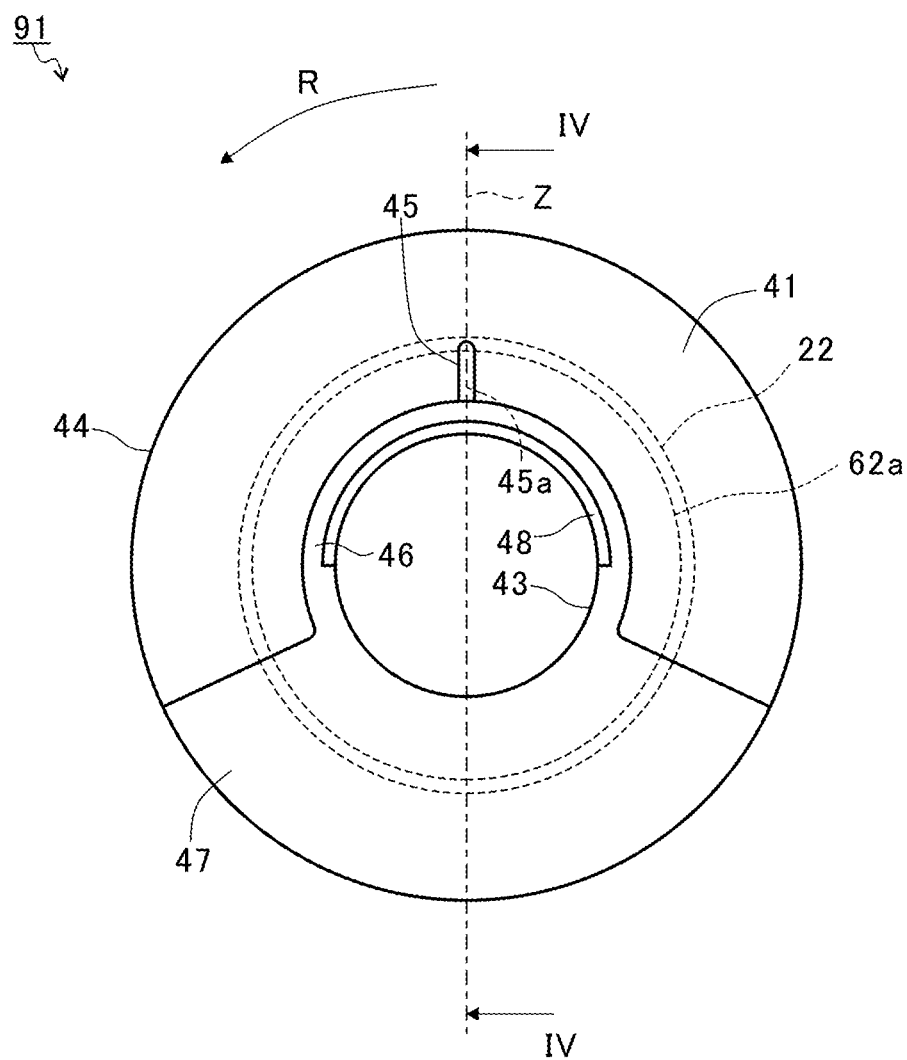
FIG. 7 is a schematic plan view of a bearing retainer plate according to yet another embodiment.

For example, in the above embodiments, the protrusion 48 continuously extends along the entire circumferential direction. In other embodiments, however, the protrusion 48 may be provided only in a portion of the circumferential direction. For example, FIG. 7 is a schematic plan view of a bearing retainer plate 91 according to yet another embodiment. The bearing retainer plate 91 differs from the bearing retainer plate 40 described above in that the protrusion 48 is provided only within a range of between −90 degrees and 90 degrees in the rotational direction R with respect to the vertical axis Z. In other respects, the bearing retainer plate 91 may be the same as the bearing retainer plate 40. That is, in the bearing retainer plate 91, the protrusion 48 is provided only on the upper half of the bearing retainer plate 91. In this case, a weight of the bearing retainer plate 91 can be reduced.

Furthermore, for example, in the above embodiments, the turbocharger TC comprises two rolling bearings 50 and 60 spaced apart from each other in the central axis direction in the bearing hole 22. In other embodiments, however, the turbocharger TC may comprise three or more rolling bearings.

In the above embodiments, the outer rings 52 and 62 are rotatable with respect to the bearing housing 2. However, in other embodiments, the outer rings 52 and 62 may be fixed to the bearing housing 2 in the rotational direction.

In the above embodiments, the pair of rolling bearings 50 and 60 are angular bearings and are configured as a face-to-face duplex bearing. However, in other embodiments, the rolling bearings may be rolling bearings other than angular bearings (e.g., deep groove ball bearings or self-aligning ball bearings). Furthermore, the pair of rolling bearings 50 and 60 may be configured as a back-to-back duplex bearing.

The present disclosure can reduce lubricant leakage into intake air and promote cleaner exhaust gas emission, thus contributing to Goal 13 "Take urgent action to combat climate change and its impacts" of the Sustainable Development Goals (SDGs) initiated by the United Nations.

What is claimed is:
1. A turbocharger comprising:
a shaft;
a rolling bearing including an inner ring mounted on the shaft and an outer ring arranged around the inner ring;
a housing including a bearing hole accommodating the rolling bearing;
a compressor impeller provided on the shaft at an outside the bearing hole; and
an annular bearing retainer plate arranged between the bearing hole and the compressor impeller in a central axis direction of the shaft and including an end face facing a side face of the outer ring, the end face including an annular circumferential oil groove continuously extending along the entire circumferential direction of the shaft and a protrusion located inside the circumferential oil groove in a radial direction of the shaft and protruding in the central axis direction of the shaft, wherein the end face of the bearing retainer plate includes a guide oil groove extending inward from an area that is radially outside the side face of the outer ring when seen from the central axis direction of the shaft and connected to the circumferential oil groove, and the circumferential oil groove is deeper than the guide oil groove.

2. The turbocharger according to claim 1, wherein the protrusion is only provided within a range of between −90 degrees and 90 degrees in a rotational direction of the shaft with respect to a vertical axis extending upward from a central axis of the shaft.

3. The turbocharger according to claim 1, wherein an entirety of the guide oil groove is located within a range of greater than 0 degrees and less than 90 degrees in a rotational direction of the shaft with respect to a vertical axis extending upward from a central axis of the shaft.

\* \* \* \* \*